Figure 1:
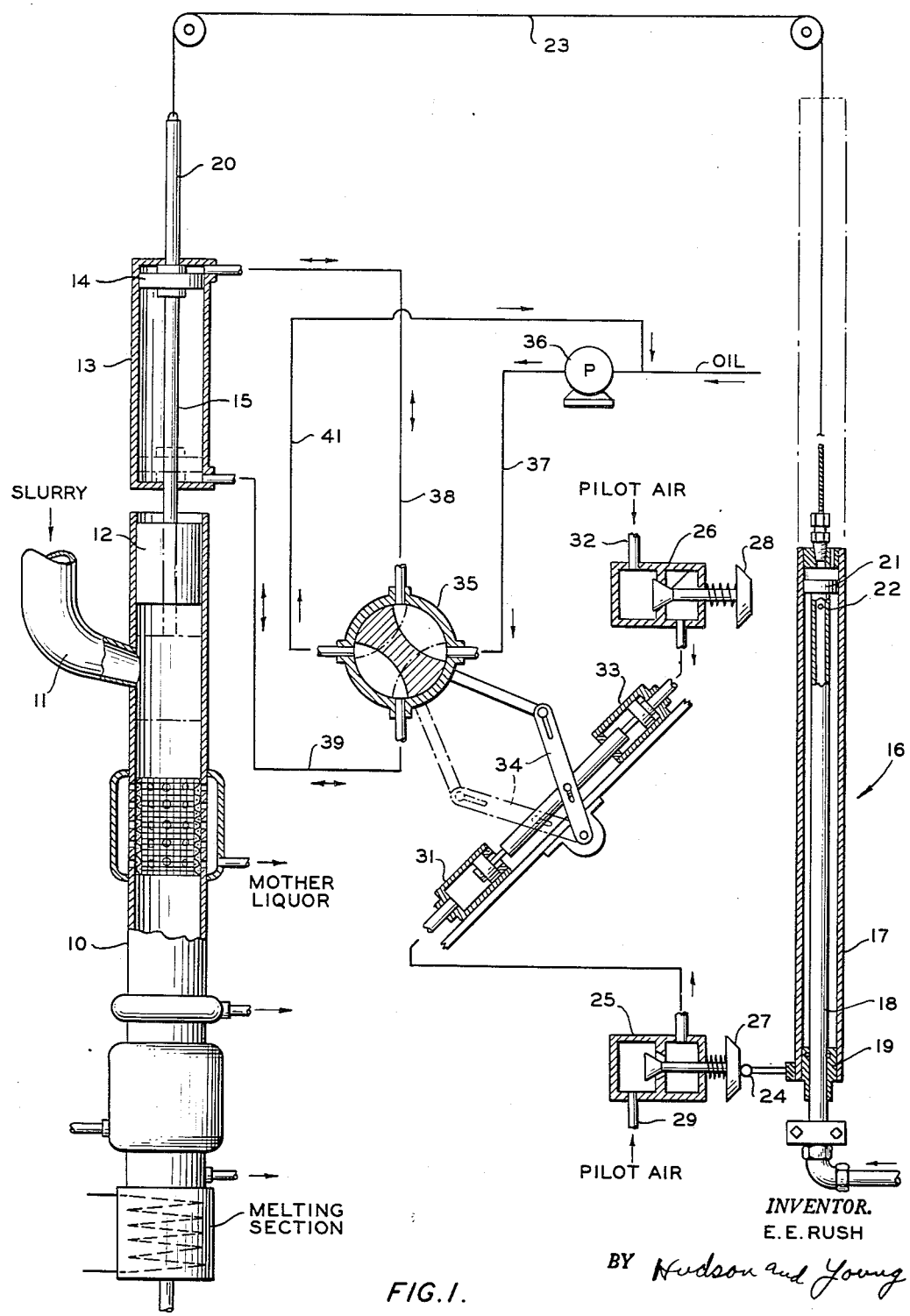

June 26, 1956　　　　　E. E. RUSH　　　　　2,751,890
CRYSTAL PURIFICATION APPARATUS CONTROL
Filed April 13, 1953　　　　　　　　　　　　　　　2 Sheets-Sheet 1

INVENTOR.
E. E. RUSH
BY Hudson and Young
ATTORNEYS

June 26, 1956 E. E. RUSH 2,751,890
CRYSTAL PURIFICATION APPARATUS CONTROL
Filed April 13, 1953 2 Sheets-Sheet 2

INVENTOR.
E. E. RUSH
BY Hudson and Young
ATTORNEYS

United States Patent Office 2,751,890
Patented June 26, 1956

2,751,890
CRYSTAL PURIFICATION APPARATUS CONTROL

Elton E. Rush, Waco, Tex., assignor to Phillips Petroleum Company, a corporation of Delaware Application April 13, 1953, Serial No. 348,347

6 Claims. (Cl. 121—164)

This invention relates to crystal separation and purification from liquid mixtures of organic compounds. In a more specific aspect, this invention relates to a method and apparatus for the control of a crystal purification system.

The separation of compounds can be effected by distillation, solvent extraction, and crystallization. Distillation and extraction processes offer advantages in economy of separation but are limited in their application to compounds having dissimilar boiling points and dissimilar solublity characteristics. Compounds having similar boiling points and similar solubility characteristics can usually be separated only by crystallization. Separation by crystallization offers the advantage over other methods in that a pure product in a single stage of operation is theoretically possible. Crystallization is thus well suited not only for the separation of many chemical isomers which can be separated by no other means but also to purify many other compounds. Although single stage crystallization theoretically offers a pure product, attainment of this ideal stage has been difficult because complete removal of occluded impurities without loss in yield is required.

This application is related to copending application, Serial No. 166,992, filed June 9, 1950, by J. A. Weedman. This copending application describes an improved process and apparatus for the separation and purification of crystals from binary and multi-component liquid organic mixtures which are eutectic forming. The only systems to which this process is not applicable are mixtures of compounds which form solid solutions. The process involves cooling the system from which the separation is to be made so as to form crystals of at least the higher melting component where the composition of the system is on that side of the eutectic favoring crystallization of the higher melting compound. These crystals are then advantageously filtered or otherwise removed from the mother liquor and introduced under pressure into a purification column in which a melt section is maintained in one end thereof. The column of crystals is maintained compact and is continuously or intermittently moved in a compact mass toward the melting section of the purification zone.

Each of the following objects will be attained by at least one aspect of this invention.

It is an object of this invention to provide a method and apparatus for controlling a crystal purification system.

It is another object to provide an improved apparatus for controlling the length of the piston stroke in a crystal purifier.

It is still another object to provide an automatic control for a piston-type crystal purifier which can be mounted upon a control board at a point remote from said crystal purifier.

It is still another object to provide a control system for a piston-type purifier which is simple and completely automatic.

Other objects will be apparent to one skilled in the art from a consideration of the accompanying description and drawing which form a part of this disclosure.

I have devised a flexible control system for controlling the movement of a reciprocating piston used in a crystal purification column. The control of the piston according to my invention is obtained through the use of a novel piston-follower which is attached to the piston by a suitable linkage so as to actuate valves which govern the direction of movement of the piston at the extremity of each stroke.

A more comprehensive understanding of the invention can be had from a consideration of the accompanying drawing of which Figure 1 is a side elevation, partly in section, of one form of crystal purification apparatus controlled by the device of my invention.

Figure 2:
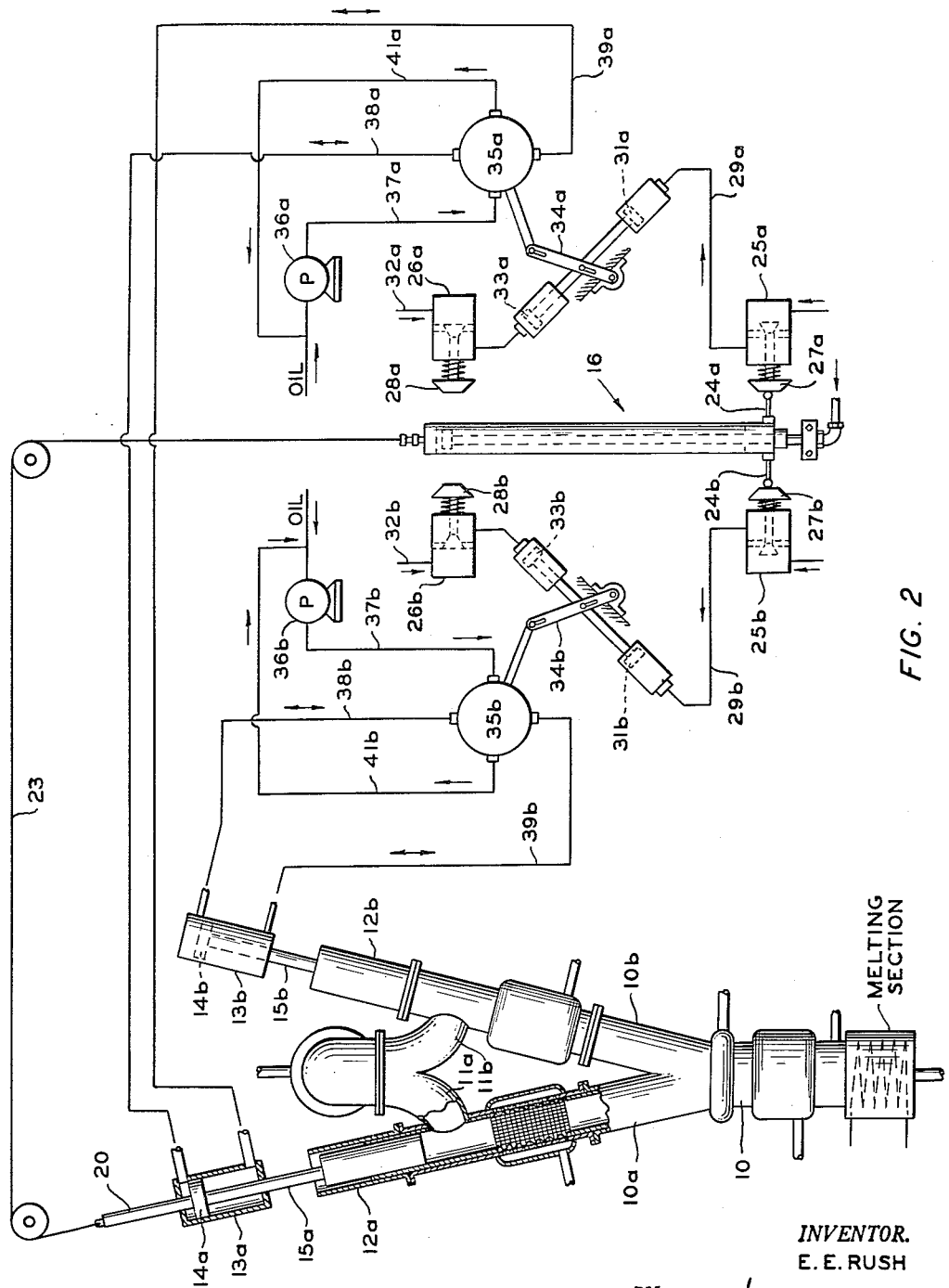

Figure 2 is a similar view of a different form of crystal purification apparatus wherein the device of my invention is employed to control the movement of the pistons.

Referring to Figure 1, numeral 10 refers to a cylindrical purification column containing a melting section in the lower end and a washing or purification section in the upper end thereof. Crystal and mother liquor slurry is admitted to the cylinder 10 through inlet 11 and is compressed toward the melting section by the compression stroke of piston 12 in the upper end of column 10. A hydraulic cylinder 13 having a piston 14 is connected to piston 12 through connecting rod 15 and provides power for the movement of piston 12. Piston-follower 16 comprises a casing 17 surrounding a pipe 18 which operates as a piston in casing 17. A sealing gasket 19 is located in the lower end of casing 17 to provide a close fit around pipe 18. Pipe 18 terminates in a piston 21 which provides a close fit between pipe 18 and casing 17. An air hole 22 is located in pipe 18 just below piston 21 to admit compressed ballast air which tends to force casing 17 downwardly on pipe 18. A cable 23 connects the top of casing 17 and the extension 20 of piston 14 in hydraulic cylinder 13 by means of suitable pulleys.

Piston-follower casing 17 has a trip member 24 secured to its bottom edge. Air valves 25 and 26 are actuated by spring loaded cams 27 and 28. The air valves are so positioned in relation to piston-follower 16 that trip 24 opens air valve 25 at the bottom of the piston-follower travel and opens air valve 26 at the top of the piston-follower travel. Air valve 25 is positioned in compressed air line 29 to servo-piston 31 and air valve 26 is positioned in compressed air line 32 to servo-piston 33. The air utilized to move the pistons is vented to the atmosphere through leakage around the spring loaded stems of valves 25 and 26 and around the pistons of servo-pistons 31 and 33 as is conventional in the art. This expedient provides smooth operation of the servo-pistons because the movement of the pistons is effected against a cushion of escaping air. Servo-pistons 31 and 33 actuate linkage 34 which operates hydraulic valve 35 so as to direct hydraulic fluid from pump 36 to hydraulic cylinder 13 through lines 37 and 38 or 39. Hydraulic fluid is returned through line 41 to the inlet of pump 36.

In Figure 2 wherein the upper portion of cylinder 10 is composed of two V-shaped cylinders, like numerals refer to like members wherever possible. The upper portion of cylinder 10 is divided into cylinders 10a and 10b having feed entries 11a and 11b and pistons 12a and 12b, hydraulic cylinders 13a and 13b and pistons 14a and 14b connected to pistons 12a and 12b by connecting rods 15a and 15b. Piston-follower 16 operates air valves 25a and 25b to actuate servo-pistons 31a and 31b to operate hydraulic valves 35a and 35b so as to direct hydraulic fluid to hydraulic cylinders 13a and 13b.

The operation of the device of this invention as illustrated in Figure 1 is as follows. Pilot valves 25 and 26 are positioned, vertically, so as to determine the length of the stroke of the compression piston 12 in cylinder 10. The position of the piston-follower 16 in Figure 1 indicates that the piston 12 has just been raised to its uppermost position and trip 24 of piston-follower 16 has compressed cam 27 so as to open air valve 25 and admit compressed air to servo-piston 31 thereby moving piston 31 to the position shown and rotating valve 35 by means of linkage 34 so as to direct the flow of hydraulic fluid from pump 36 through line 37 to valve 35 and thence to line 38 and into the upper portion of hydraulic cylinder 13 thereby starting a compression stroke of piston 12. Hydraulic fluid is expelled from hydraulic cylinder 13 below piston 14 through line 39 to hydraulic valve 35 and thence through line 41 to the intake of pump 36. When the piston 12 has reached the end of the downward compression stroke, the piston-follower 16 will be raised so that trip 24 will compress cam 28 and open air valve 26 so as to admit compressed air to servo-piston 33 thereby causing hydraulic valve 35 to be rotated through linkage 34 and the hydraulic fluid will then flow from pump 36 through line 37 to valve 35 and thence through line 39 to the lower portion of hydraulic piston 13 thereby beginning an upward stroke of piston 12. The hydraulic fluid will be exhausted from above piston 14 of hydraulic cylinder 13 through line 38, valve 35, and line 41 to the intake of pump 36.

The operation of the device of Figure 2 is similar to that of the device of Figure 1, the difference being only that duplicate fluid systems are controlled by the one piston-follower. The pistons 12a and 12b can be caused to operate simultaneously or alternately according to the positions of trip members 24a and 24b.

The piston-follower device of my invention provides a simple and automatic control of the movement of the crystal purification column piston. The piston-follower can be mounted on a control panel at a distance from the crystal purification apparatus. The ballast air maintains tension on the cable connecting the piston-follower and the hydraulic piston so that the movements of the piston-follower substantially reproduce the movements of the compression piston. The ballast air can be from the same source as the compressed air which operates the servo-pistons.

It is obvious that by adjusting the positions of the pilot valves, the length of compression piston stroke can be adjusted at either or both ends. Additional hydraulic valves, pilot valves and servo-pistons can be added to control other hydraulic pistons or other mechanical equipment.

The piston-follower device can be used to operate an electrical system instead of the pneumatic system described. In such electrical system the pilot valves would be replaced by microswitches and the servo-pistons and hydraulic valves would be replaced by high pressure solenoid valves. Tension can be maintained on the cable from the hydraulic piston to the piston-follower by a spring or other means.

The control device of this invention has been successfully employed to control the operation of the Y-type crystal purifier of Figure 2 which is described and claimed in copending application of R. M. Green, Serial No. 327,380, filed December 22, 1952, entitled "Crystal Purification Process and Apparatus."

The cable and pulleys which operate the piston-follower can be replaced by synchros motors connected in an electrical circuit. As employed herein the term "synchros" refers to a particular type of electrical motor known to those skilled in the art by several trade names including Selsyn, Autosyn, Telegon, and Diehlsen. Mechanically these elements are of typical electrical motor construction and in their simplest form include two-pole rotors with sliprings and "three-phase" stator windings.

Thus a first synchros motor rotated by the movement of the hydraulic piston will result in a corresponding rotation of a second synchros motor so as to raise or lower the piston-follower device.

Although the crystal purifier apparatus has been shown with a vertical cylinder, the device of this invention will operate so as to control the motion of a compression piston in a horizontal or otherwise disposed cylinder.

The piston-follower can also be mounted in a horizontal position or it can be inverted, by the use of an additional pulley, so that the direction of travel of the piston-follower will be the same as that of the hydraulic piston and thus the compression piston.

Reasonable variations and modifications are possible within the scope of the disclosure of the present invention, the essence of which is a simple and automatic device for reversing the motion of a reciprocating piston after the piston has traveled a predetermined distance.

I claim:

1. In a piston-type crystal purifier wherein the crystal compression piston is operated by a hydraulic fluid supplied to a hydraulic piston the improvement which comprises a piston-follower adapted to duplicate the stroke of said hydraulic piston against a predetermined fluid pressure; and adjustable means actuated by said follower at the end of each stroke so as to reverse the flow of the hydraulic fluid when the hydraulic piston has traveled a predetermined distance whereby the direction of movement of said piston is reversed.

2. In a piston-type crystal purifier wherein the compression piston is operated by a hydraulic piston and cylinder device, said pistons being secured to a common shaft an improved controller comprising a 2-position, 4-way hydraulic valve in the pressure fluid system to said hydraulic piston and cylinder device for directing said fluid to inlets and outlets of said cylinder; a piston-follower comprising a movable cylinder and fixed piston, said cylinder being connected by a flexible linkage to said hydraulic piston so as to duplicate the movements of said hydraulic piston against a predetermined fluid pressure maintained in said piston-follower; cam-operated valves operated by said piston-follower at each end of its travel and adjustably positioned to determine the length of stroke of said hydraulic piston; and power transmitting means actuated by fluid flowing through said cam-operated valves so as to change the position of said hydraulic valve whereby the flow of fluid to said hydraulic cylinder is reversed.

3. In an apparatus for the separation and purification of crystals comprising an upright, elongated, closed vessel having inlets and outlets and a reciprocating first piston adapted to produce a downward stroke, said reciprocating first piston being actuated by a hydraulic second piston and cylinder, the improved control system which comprises an axially moveable, hollow, cylindrical piston-follower having an open end and a closed end; a linkage operatively connecting said closed end with said reciprocating second piston so that said piston-follower follows the motion of said second piston; at least one dog member projecting from the side of said piston-follower; a fixed third piston positioned in said piston-follower by a hollow piston rod extending through the open end of said piston-follower; said piston rod having an opening connecting the interior of said rod and the interior of said piston-follower; packing means for providing a close fit between said hollow piston rod and the open end of said piston-follower; a supply of pressure fluid connected to said hollow piston rod; at least two cam-operated air valves having the cams aligned with said dog and spaced apart by a distance defining the length of the stroke of said reciprocating second piston; at least two servo-pistons actuated by said air valves; a 2-position, 4-way hydraulic valve, actuated by said servo-pistons; a supply of hydraulic fluid; lines connecting said hydraulic fluid supply through said hydraulic valve to the inlet and outlet of said hydraulic second piston and cylinder; and a source of power for forcing said fluid through said lines.

4. In an apparatus for the separation and purification of crystals comprising an upright, elongated vessel having a heater in the closed lower portion, a reciprocable piston disposed in the upper portion adapted to produce a downward compression stroke, a crystal slurry inlet in the upper portion, a mother liquor outlet in an intermediate portion, a molten crystal outlet in the lower portion; and a source of motivating power adapted to reciprocate said piston; the improvement comprising a piston-follower connected to said piston so as to reproduce the movement of said piston at a remote point; power transmitting means operated by said piston-follower at the end of each compression stroke so as to transmit power to lift said piston and disconnect the source of power to the compression stroke; and power transmitting means operated by said piston-follower at the end of each lifting stroke so as to transmit power to produce a compression stroke and disconnect the source of power to the lifting stroke, each of said power transmitting means being adjustable so as to determine the length of compression and lifting strokes.

5. In a piston-type crystal purifier wherein a crystal mass is compressed by a piston actuated by a hydraulic piston and cylinder operated by a flow of hydraulic fluid and secured to a common shaft with said hydraulic piston the improvement which comprises a piston-follower member operatively connected to said hydraulic piston so as to duplicate the distance traveled by said piston; and means actuated by said piston-follower at each end of the hydraulic piston stroke so as to reverse the flow of hydraulic fluid to said hydraulic piston, said means being adjustable so as to vary the length of stroke of the hydraulic piston from either end.

6. A reciprocating piston control system comprising a hydraulic piston and cylinder; a supply of hydraulic fluid; means for delivering hydraulic fluid to one end of said cylinder at a pressure sufficient so as to move said piston; means for removing hydraulic fluid from the other end of said cylinder to said supply as it is displaced; a 2-position, 4-way valve; conduit means connecting said valve with each end of said cylinder and with said means for delivering hydraulic fluid; an axially moveable, cylindrical piston-follower having an open end and a closed end; a flexible linkage operatively connecting said closed end with one end of said hydraulic piston; at least one cam member secured to the side of said piston-follower; a fixed piston positioned in said piston-follower by a hollow piston rod extending through the open end of said piston-follower; a supply of pressure fluid; conduit means connecting said supply of pressure fluid to said hollow piston rod; fluid inlet means communicating between the interior of said piston-follower and the interior of said hollow piston rod at a point adjacent the piston; packing means providing a close fit between said hollow piston rod and the open end of said piston-follower; a first cam-operated pressure fluid valve aligned with said cam and positioned so as to contact said cam when said hydraulic piston has traveled a predetermined distance toward a first end of said cylinder; pressure fluid conduit means connecting said supply of pressure fluid to said first pressure fluid valve; a pressure fluid-operated first servo-piston operatively connected to said 2-position, 4-way valve so as to change the position of said valve; conduit means connecting said first servo-piston to said first pressure fluid valve so as to actuate said servo-piston; a second cam-operated pressure fluid valve aligned with said cam and positioned so as to contact said cam when said hydraulic piston has traveled a predetermined distance toward a second end of said cylinder; pressure fluid conduit means connecting said supply of pressure fluid to said second pressure fluid valve; a pressure fluid-operated second servo-piston operatively connected to said 2-position, 4-way valve so as to change the position of said valve opposite to that of said first servo-piston; and conduit means connecting said second servo-piston to said second pressure fluid valve so as to actuate said second servo-piston.

References Cited in the file of this patent

UNITED STATES PATENTS

| 2,555,427 | Troutman | June 5, 1951 |
| 2,612,142 | Smith | Sept. 30, 1952 |
| 2,617,274 | Schmidt | Nov. 11, 1952 |